United States Patent
Bodke et al.

(10) Patent No.: US 10,787,097 B2
(45) Date of Patent: Sep. 29, 2020

(54) VEHICLE SEATING SYSTEM

(71) Applicant: LEAR CORPORATION, Southfield, MI (US)

(72) Inventors: Samir Bodke, Pune (IN); Vikas Metkari, Pune (IN)

(73) Assignee: Lear Corporation, Southfield, MI (US)

( * ) Notice: Subject to any disclaimer, the term of this patent is extended or adjusted under 35 U.S.C. 154(b) by 55 days.

(21) Appl. No.: 16/208,985

(22) Filed: Dec. 4, 2018

(65) Prior Publication Data
US 2020/0171978 A1 Jun. 4, 2020

(51) Int. Cl.
*B60N 2/015* (2006.01)
*B60N 2/30* (2006.01)

(52) U.S. Cl.
CPC ........ *B60N 2/01558* (2013.01); *B60N 2/305* (2013.01); *B60N 2/3013* (2013.01); *B60N 2/3043* (2013.01); *B60N 2/3097* (2013.01)

(58) Field of Classification Search
CPC ............. B60N 2/01558; B60N 2/3013; B60N 2/3043; B60N 2/305; B60N 2/3097
See application file for complete search history.

(56) References Cited

U.S. PATENT DOCUMENTS

| | | | | |
|---|---|---|---|---|
| 5,184,871 A | * | 2/1993 | Lapointe | A47C 4/02 297/440.21 |
| 5,575,389 A | * | 11/1996 | Alspach | B60N 2/01508 108/55.5 |
| 6,039,401 A | * | 3/2000 | Rus | B60N 2/01583 296/65.03 |
| 10,065,548 B2 | * | 9/2018 | Dunn | B60N 2/3011 |
| 10,300,810 B1 | * | 5/2019 | Salenbien | B60N 2/01583 |
| 2004/0056524 A1 | * | 3/2004 | O'Connor | B60N 2/20 297/378.12 |
| 2005/0116493 A1 | * | 6/2005 | Falchero | B60N 2/3011 296/65.09 |
| 2006/0249972 A1 | * | 11/2006 | Lutzka | B60N 2/01583 296/65.03 |
| 2007/0080554 A1 | * | 4/2007 | Willing | B60N 2/919 296/65.03 |

(Continued)

FOREIGN PATENT DOCUMENTS

DE 202017102493 U1 * 5/2017 ............. B60N 2/305
EP 1911624 A2 4/2008
(Continued)

OTHER PUBLICATIONS

Seating System Photos filed in Information Disclosure Statement of Dec. 12, 2019.

*Primary Examiner* — Lori L Lyjak
(74) *Attorney, Agent, or Firm* — Brooks Kushman P.C.

(57) ABSTRACT

A seating system for a vehicle having a vehicle body includes a seat bottom and a seat back. The seat bottom includes first and second attachments to the vehicle body, where the first attachment has a locked position for securing the seat bottom to the vehicle body and an unlocked position for facilitating detachment of the seat bottom from the vehicle body. The seat bottom is slidingly attachable to and detachable from the vehicle body at the second attachment when the first attachment is in the unlocked position. The seat back pivotably connected to and slidingly attachable to and detachable from the seat bottom.

16 Claims, 4 Drawing Sheets

(56) References Cited

U.S. PATENT DOCUMENTS

| | | | |
|---|---|---|---|
| 2011/0018300 A1* | 1/2011 | Galbreath | B60N 2/015 296/63 |
| 2011/0049953 A1* | 3/2011 | Champ | B60N 2/305 297/326 |
| 2011/0227385 A1 | 9/2011 | Holder | |
| 2015/0375643 A1* | 12/2015 | Fisher | B60N 2/015 297/334 |
| 2017/0297458 A1* | 10/2017 | Pereira | B60N 2/01583 |
| 2018/0170218 A1* | 6/2018 | Nowland | B60N 2/688 |
| 2018/0170219 A1* | 6/2018 | Deschamps | B60N 2/36 |

FOREIGN PATENT DOCUMENTS

| | | | |
|---|---|---|---|
| JP | 2011162125 A | 8/2011 | |
| WO | WO-03039935 A1 * | 5/2003 | B60N 2/36 |
| WO | WO-2006101612 A1 * | 9/2006 | B60N 2/305 |

* cited by examiner

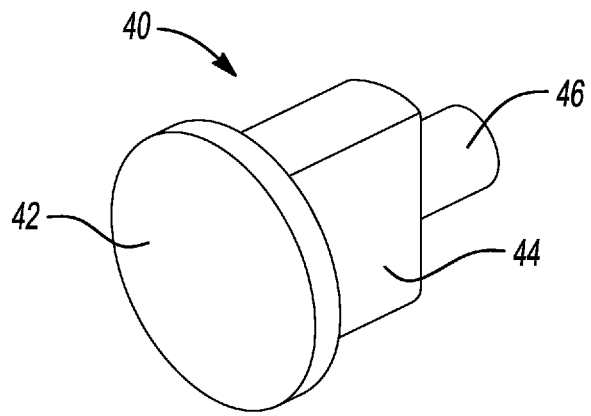
_Fig-4A_
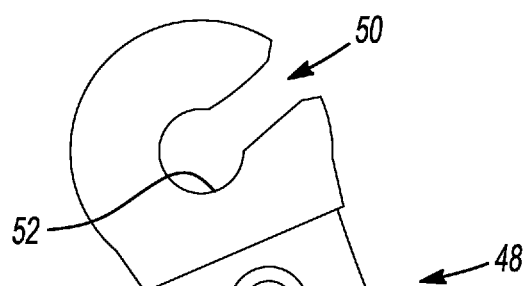
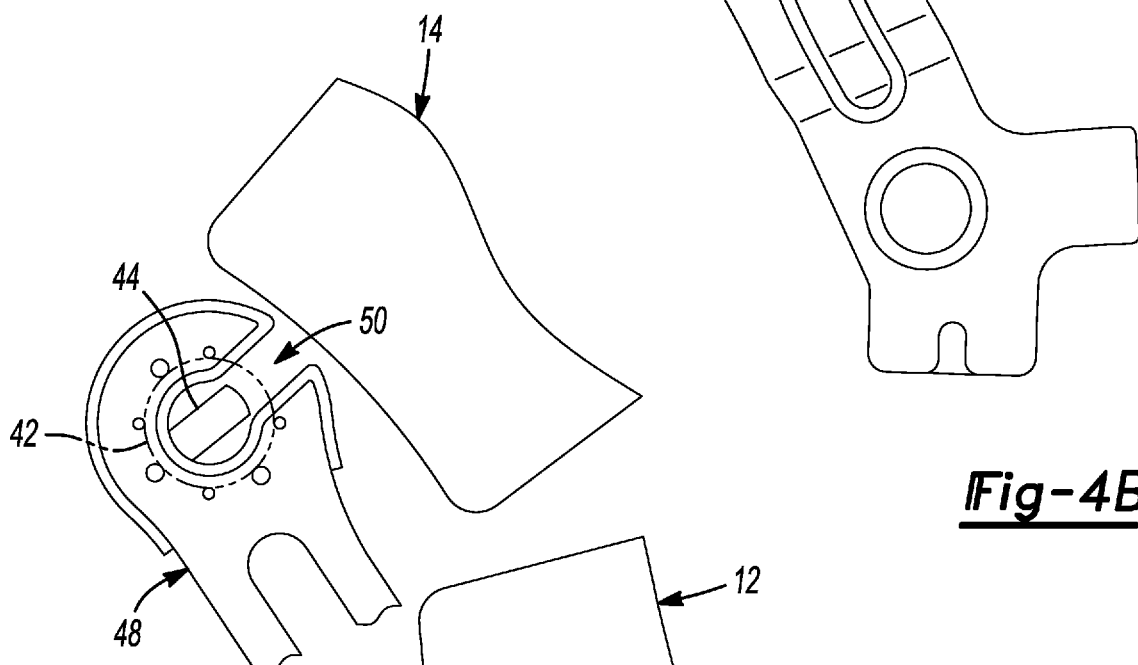
_Fig-4B_
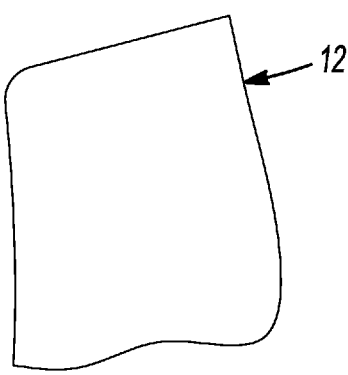
_Fig-5_

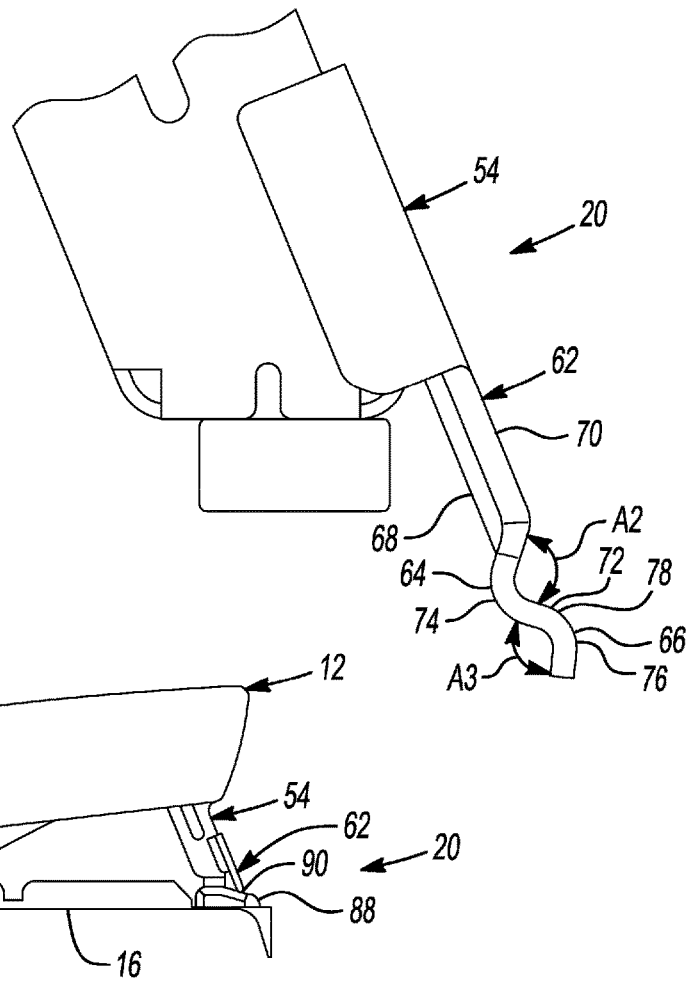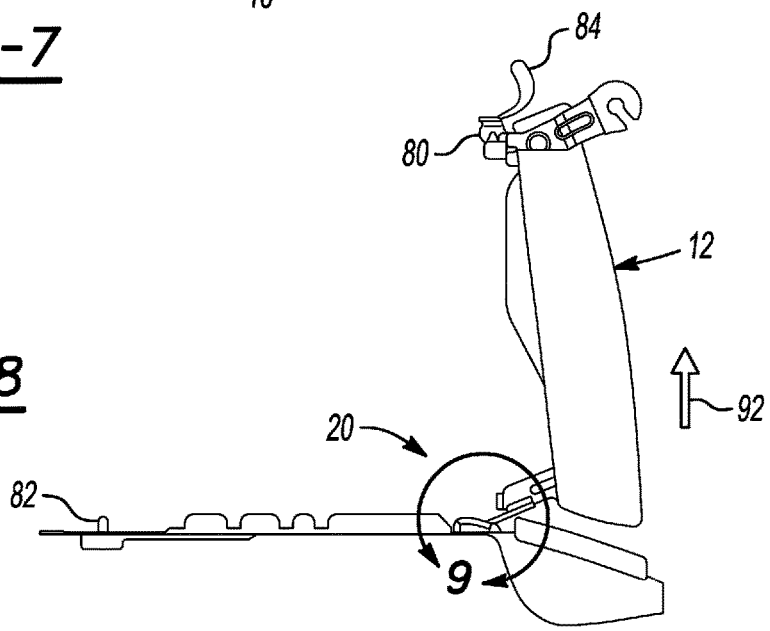

VEHICLE SEATING SYSTEM

TECHNICAL FIELD

The present disclosure relates to a vehicle seating system.

BACKGROUND

Seating systems in vehicles must meet a number of important requirements. For example, they must be securely fastened within the vehicle to avoid undesired movement during operation of the vehicle, which could lead to occupant discomfort. Competing with the requirement to have securely mounted seating systems is the desire to have flexibility with regard to seating and storage within the vehicle. In some vehicles these competing interests are accommodated by seats that fold down or stow away to provide more storage area. Because the seats are securely mounted in the vehicle, it may be impractical or impracticable to remove the seats entirely from the vehicle, and yet this would provide a large amount of additional storage space. Therefore, a need exists for a vehicle seating system that can be removed from a vehicle without an undesirable amount of work required by the operator.

SUMMARY

Embodiments described herein may include a seating system for a vehicle having a vehicle body. The seating system may include a seat bottom attached to the vehicle body at a front attachment and a rear attachment. One of the front attachment or the rear attachment may have a locked position in which rotation of the seat bottom about the other of the front attachment or the rear attachment is inhibited and an unlocked position in which rotation of the seat bottom about the other of the front attachment or the rear attachment is facilitated. The other of the front attachment or the rear attachment may be slidingly attachable to and detachable from the vehicle body when the one of the front attachment or the rear attachment is in the unlocked position and the seat bottom is rotated about the other of the front attachment or the rear attachment. The seating system may further include a seat back pivotably connected to the seat bottom and slidingly attachable to and detachable from the seat bottom when the seat back is positioned relative to the seat bottom at a predetermined angular orientation.

Embodiments described herein may include a seating system for a vehicle having a vehicle body. The seating system may include a seat bottom including first and second attachments to the vehicle body. The first attachment may have a locked position for securing the seat bottom to the vehicle body at the first attachment and an unlocked position for facilitating detachment of the seat bottom from the vehicle body at the first attachment. The seat bottom may be slidingly attachable to and detachable from the vehicle body at the second attachment when the first attachment is in the unlocked position. A seat back may be pivotably connected to and slidingly attachable to and detachable from the seat bottom.

Embodiments described herein may include a seating system for a vehicle having a vehicle body. The seating system may include a seat bottom attached to the vehicle body at a front attachment and a rear attachment. One of the front attachment or the rear attachment may have a locked position for securing the seat bottom to the vehicle body and an unlocked position for facilitating detachment of the seat bottom from the vehicle body. The seat bottom may be slidingly attachable to and detachable from the vehicle body at the other of the front attachment or the rear attachment when the one of the front attachment or the rear attachment is in the unlocked position. A seat back may be pivotably connected to and slidingly attachable to and detachable from the seat bottom.

BRIEF DESCRIPTION OF THE DRAWINGS

FIGS. 4A and 4B show portions of a slotted hinge-pin arrangement used with the seat shown in FIG. 3;

FIG. 5 shows a detail view of the slotted hinge-pin arrangement;

FIG. 6 shows a detail view of a front attachment used on the seating system illustrated in FIG. 1;

FIG. 7 shows a side view of a seat bottom of the seating system illustrated in FIG. 1;

FIG. 8 shows the seat bottom illustrated in FIG. 6 rotated forward about the front attachment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
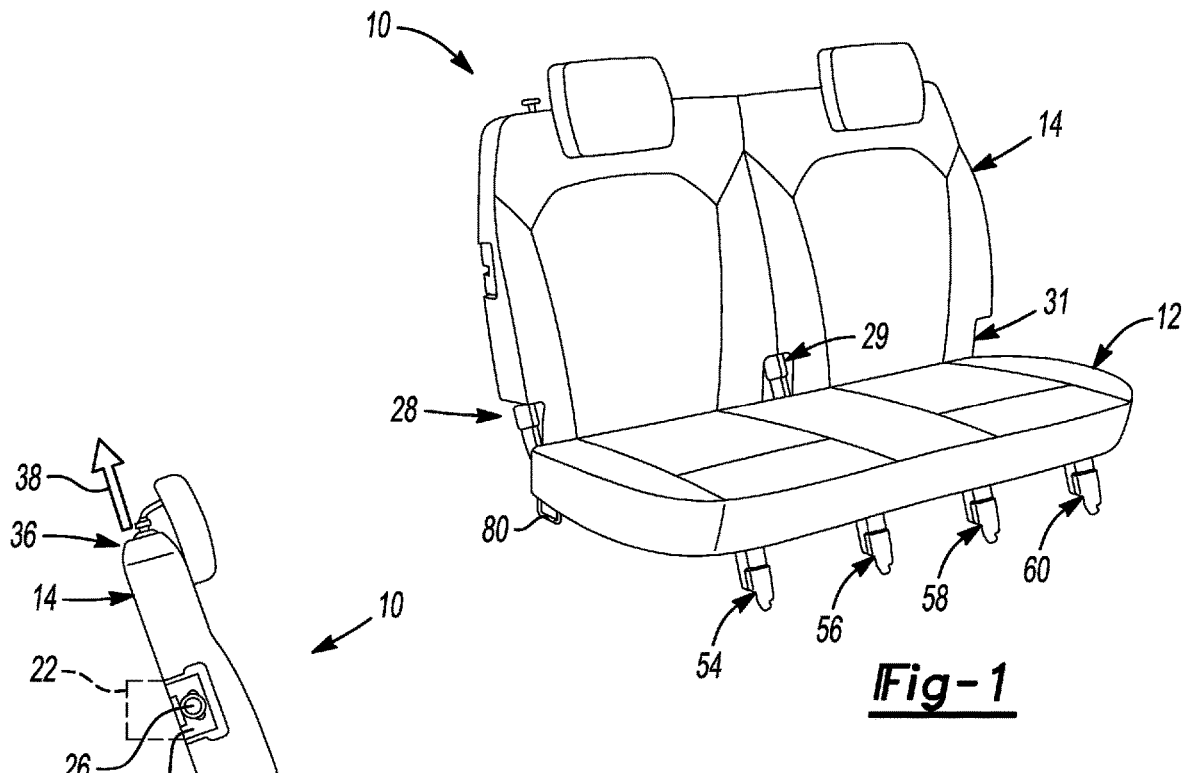
FIG. 1 shows a perspective view of a seating system in accordance with embodiments described herein.
Figure 2:
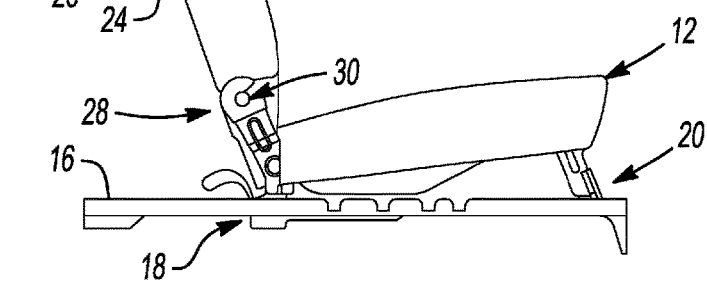
FIG. 2 shows a side view of the seating system illustrated in FIG. 1 attached to a vehicle body.

FIG. 1 shows a seating system 10 in accordance with embodiments described herein. The seating system 10 includes a seat bottom 12, and a seat back 14. In the embodiment illustrated in FIG. 1, the seat bottom 12 is a bench-style seat bottom, and the seat back 14 includes a single seat back that is configured to accommodate two passengers. In other embodiments, a seating system, such as the seating system 10, may be a 60-40 seat, individual bucket seats, or some other configuration. As shown in FIG. 2, the seating system 10 is attached to a vehicle body 16. More particularly, the seat bottom 12 is attached to a floor portion 16 of the vehicle body at a rear attachment 18, which may be conveniently referred to as a first attachment, and at a front attachment 20, which may be conveniently referred to as a second attachment. The seat back 14 is also attached to the vehicle body, and more particularly, it is attached to a side portion 22 shown in phantom in FIG. 2. The seat back 14 includes a latch 24 that connects to a striker pin 26 secured to the side portion 22 of the vehicle body.

The seat back 14 is pivotably connected to the seat bottom 12, and it is slidingly attachable to and detachable from the seat bottom 12. More particularly, the seat back 14 and seat bottom 12 are connected at an attachment 28 that includes a slotted hinge-pin arrangement 30. As shown in FIG. 1, additional attachments 29, 31 are positioned centrally and on an opposite side of the seat back 14, respectively. The slotted hinge-pin arrangement 30 facilitates pivoting of the seat back 14 relative to the seat bottom 12, and also facilitates attachment and detachment of the seat back 14 relative to the seat bottom 12 when the seat back 14 is positioned relative to the seat bottom 12 at a predetermined angular orientation.

Figure 3:
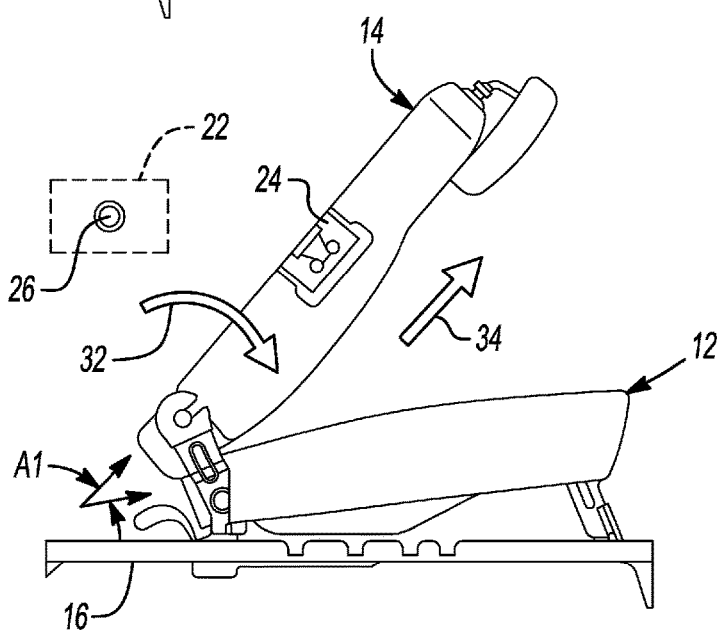
FIG. 3 shows the seat shown FIG. 2 in a partially folded-down position.

FIG. 3 shows the seat back 14 rotated forward as indicated by the directional arrow 32. To release the seat back 14 from its attachment to the side portion 22 of the vehicle body so that it can be rotated forward, a release mechanism 36 can be actuated as indicated by the directional arrow 38 shown in FIG. 2. This disengages the latch 24 from the striker pin 26 and allows the seat back 14 to be rotated forward. The position of the seat back 14 relative to the seat bottom 12 is indicated by angle (A1), which represents the predetermined angular orientation wherein the seat back 14 can be slidingly detached from the seat bottom 12. After the seat back 14 is rotated to the position shown in FIG. 3, it can be detached from the seat bottom 12 by moving it in the direction indicated by the directional arrow 34.

FIGS. 4A and 4B show components of the slotted hinge-pin arrangement 30, and more particularly, FIG. 4A shows a pin arrangement 40 having a flange 42, a generally rectangular portion 44 extending outward from the flange 42, and a generally cylindrical pin 46 extending outward from the rectangular portion 44. In the embodiment shown in FIGS. 1-3, the pin arrangement 40 is welded to the seat back 14, although it may be attached by other means as well. FIG. 4B shows a frame structure 48 configured to receive the pin arrangement 40 therein. In the embodiment shown in FIGS. 1-3, the frame structure 48 is welded or otherwise attached to a frame structure of the seat bottom 12, although in other embodiments, the frame structure 48 may be attached to the seat back 14 and the pin arrangement 40 attached to the seat bottom 12. The slotted hinge-pin arrangement 30 is configured such that the rectangular portion 44 is slidable into and out of a slot 50 in the frame structure 48. Once the rectangular portion 44 is inserted into the slot 50, the pin arrangement 40 may be rotated within the generally circular opening 52 at the end of the slot 50. This occurs when the seat back 14 is rotated relative to the seat bottom 12.

When the seat back 14 is in the predetermined angular orientation as shown in FIG. 3, the rectangular portion 44 is aligned with slot 50; this is illustrated in FIG. 5. Although the predetermined angular orientation is illustrated and described as a particular angle (A1), it is understood that a slotted hinge-pin arrangement such as the slotted hinge-pin arrangement 30 may be manufactured such that the predetermined angular orientation encompasses a range of angles wherein the seat back 14 may be inserted into and removed from the attachments 28, 29, 31 with the seat bottom 12. The configuration of the slotted hinge-pin arrangement 30 allows the seat back 14 to be easily detached from the seat bottom 12, and if desired, removed from a vehicle entirely. More particularly, the entire process can be performed without the use of any tools. As readily discernable from FIG. 5, once the seat back 14 is rotated toward an upright position and is no longer within the predetermined angular orientation, the rectangular portion 44 will no longer be aligned with slot 50, and the seat back 14 will not be removable from the seat bottom 12.

Embodiments described herein are also configured to allow the seat bottom 12 to be detached from the floor 16 of the vehicle body without the use of any tools. FIG. 6 shows a portion of the front attachment 20, and in particular, a seat-bottom component 54 that is attached to the seat bottom 12. As shown in FIG. 1, the seat bottom 12 includes four of the seat-bottom components 54, 56, 58, 60. It is understood that each of the seat-bottom components 54, 56, 58, 60 is attached to the floor 16 of the vehicle body, such that there are four of the front attachments for the seat bottom 12, which helps to secure the wide bench-style seat to the vehicle body. Returning to FIG. 6, it is shown that the seat-bottom component 54 includes an elongated member 62.

The elongated member 62 includes a first curved portion 64 and the second curved portion 66. The first curved portion 64 has a first orientation—i.e., it is convex toward one side 68 of the elongated member 62 and concave toward another side 70 of the elongated member 62. The second curved portion 66 has a second orientation that is different from the first orientation associated with the first curved portion 64. More particularly, the second curved portion 66 is convex toward the side 70 of the elongated member 62 and concave toward the side 68 of the elongated member 62. The first and second curved portions 64, 66 define a transition portion 72 between them where the curve of the elongated member 62 transitions between the first orientation and the second orientation.

As shown in FIG. 6, the first curved portion 64 is positioned proximally along the elongated member 62, while the second curved portion 66 is positioned distally along the elongated member 62. The first curved portion 64 functions as a locking portion of the elongated member 62 and defines a first curve 74 associated with the first curved portion 64. Similarly, the second curved portion 66 functions as an insertion portion and defines a second curve 76 associated with the second curved portion 66. The elongated member 62 defines an inflection point 78 between the first curve 74 and the second curve 76. In the embodiment shown in FIG. 6, the first curved portion 64 defines an angle (A2) of approximately 90°. Conversely, the second curved portion 66 defines an angle (A3) of approximately 80°. In other embodiments, these angles may be different, but as explained in more detail below, these angles determine how the seat bottom 12 is rotated to attach and detach the seat bottom 12 to and from the floor 16 of the vehicle.

FIG. 7 shows the seat bottom 12 with the seat back 14 removed. The seat bottom 12 is attached to the floor 16 of the vehicle at both the front attachment 20 and the rear attachment 18. As described above, the seat bottom 12 includes a number of front attachments—see, e.g., the seat-bottom components 54, 56, 58, 60 of these front attachments shown in FIG. 1—and likewise, includes a number of rear attachments positioned along its width similar to the rear attachment 18. The rear attachment 18 has a locked position as shown in FIG. 7, and it also has an unlocked position as illustrated in FIG. 8. In this embodiment, the rear attachment 18 includes a latch hook 80 and a striker bar 82 configured to cooperate with each other to secure the seat bottom 12 to the vehicle body—in this case, the floor 16. When the rear attachment 18 is in the locked position, rotation of the seat bottom 12 about the front attachment 20 is inhibited; however, when it is in the unlocked position, rotation of the seat bottom 12 about the front attachment 20 is facilitated.

In the embodiment shown in FIG. 7, a strap 84 is connected to the latch hook 80, and pulling the strap 84 in the direction indicated by the directional arrow 86 unlatches the latch hook 80 from the striker bar 82. Once the rear attachment 18 is in the unlocked position, the seat bottom 12 can be detached from the floor 16 and rotated about the front attachment 20 as shown in FIG. 8. As explained in more detail below, this facilitates detachment of the seat bottom 12 from the floor 16 at the front attachment 20. In addition to the elongated member 62, the front attachment 20 includes a receiving member 88 mounted to the vehicle body, and in this embodiment, to the vehicle floor 16. The receiving member 88 may be, for example, welded, riveted, or attached with other fasteners to the floor 16. The receiving member 88 includes an aperture 90 configured to receive the elongated member 62 therein. More specifically, the aperture 90 is configured to receive the insertion portion, or second curved portion 66, to allow a portion of the elongated member 62 to be slidingly engageable to and disengageable from receiving member 88.

After the rear attachment 18 is unlocked, the seat bottom 12 can be rotated forward about the front attachment 20—it being understood that if more than one of the rear attachments had a locking feature, they would all be unlocked prior to rotating the seat bottom 12 forward. As shown in FIG. 7, the first curved portion 64 of the elongated member 62 is engaged with the receiving member 88; however, because of the orientation of the first curved portion 64, the seat bottom 12 can be rotated forward as the first curved portion 64 begins to slide out of the aperture 90. As described above, the angle (A2) is approximately 90°, so once the seat bottom 12 has been rotated forward by about 90° as shown in FIG. 8, it can be moved vertically upward as indicated by the directional arrow 92.

Figure 9:
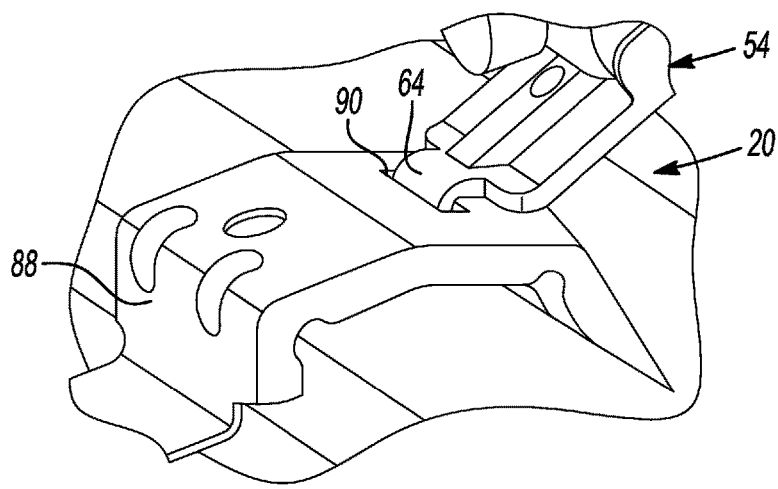
FIG. 9 shows a detail view of the front attachment illustrated in FIG. 8.

The distance that the seat bottom 12 needs to be moved upward depends on the configuration of the curved portions 64, 66 of the elongated member 62. In this embodiment, the curved portions 64, 66 define a relatively short transition portion 72, so that the seat bottom 12 need only be moved upward by approximately 2 millimeters for the second curved portion 66 to engage the aperture 90. The front attachment 20—with the seat bottom 12 as positioned in FIG. 8—is shown in detail in FIG. 9. In this view, the first curved portion 64 is almost entirely disengage from the receiving member 88 and is ready to be moved vertically upward through the transition portion 72 so that the second curved portion 66 engages with the aperture 90. As shown in detail in FIG. 6, the first and second curved portion 64, 66 have opposing orientations so that once the second curved portion 66 engages with the aperture 90, it is necessary to rotate the seat bottom 12 back in the direction toward its use position. This is illustrated in FIG. 10.

Figure 10:
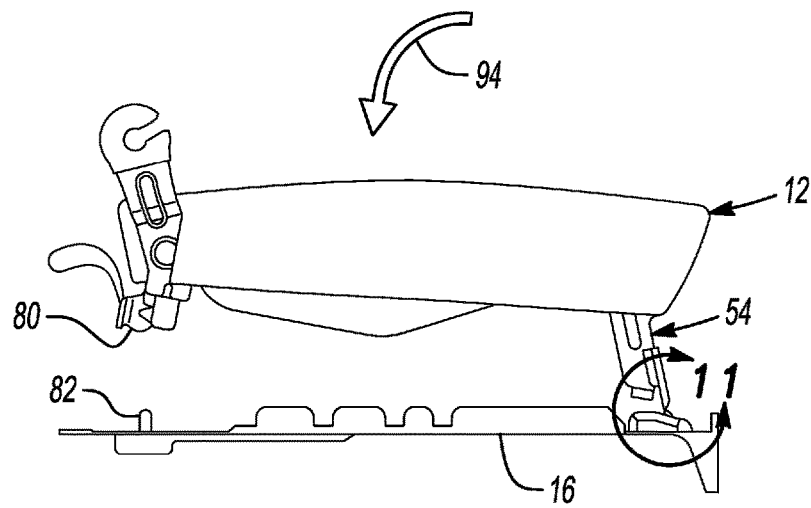
FIG. 10 shows the seat bottom illustrated in FIG. 6 rotated rearward about the front attachment.
Figure 11:
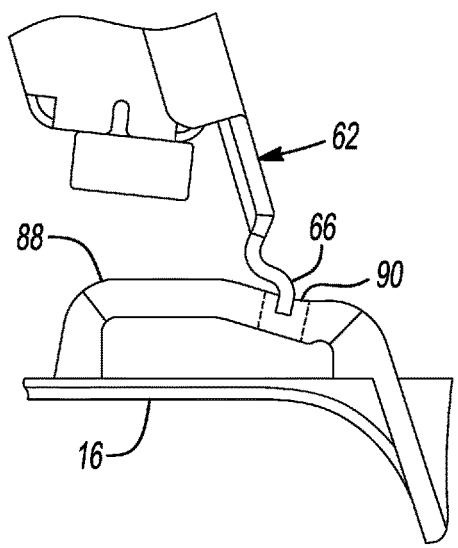
FIG. 11 shows a detail view of the front attachment illustrated in FIG. 10.

In FIG. 10, the seat bottom 12 has been rotated back down toward its use position as indicated by the directional arrow 94. In this case, however, it has not been rotated completely back—i.e., 90°—but rather, it has been rotated back approximately 80°. This coincides with angle (A3) associated with the second curved portion 64 as shown in FIG. 6. Thus, the latch hook 80 does not engage with the striker bar 82 and the rear attachment 18 remains in the unlocked position. With the seat bottom 12 in this position, the second curved portion, and indeed the entire seat-bottom component 54, can be removed from the receiving portion 88—this is illustrated in detail in FIG. 11. As shown in FIG. 11, the second curved portion 66 can be removed from the aperture 90 by lifting the seat bottom 12 vertically upward.

Reattaching the seat bottom 12 to the vehicle body requires only a reversal of the steps described above: the second curved portion 66 is inserted vertically downward into the aperture 90, the seat bottom 12 is rotated forward by approximately 80° until it can be moved vertically downward so the transition portion 72 passes through the aperture 90, and finally, the seat bottom 12 is rotated rearward by approximately 90° until the latch hook 80 engages with the striker bar 82, and the rear attachment 18 is again in the locked position. Embodiments described herein allow a seat back, such as the seat back 14, to be removed from a seat bottom, such as the seat bottom 12, without the use of tools. Similarly, a seat bottom, such as the seat bottom 12, can be removed from its attachment to a vehicle body, such as the vehicle floor 16, also without the use of tools. When additional seating is desired, the seat bottom 12 can be re-attached to the floor 16 as described above, and the seat back 14 can be reattached to the seat bottom 12 to complete the reinstallation process.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seating system for a vehicle having a vehicle body, the seating system comprising:
a seat bottom attached to the vehicle body at a front attachment and a rear attachment, one of the front attachment or the rear attachment having a locked position in which rotation of the seat bottom about the other of the front attachment or the rear attachment is inhibited and an unlocked position in which rotation of the seat bottom about the other of the front attachment or the rear attachment is facilitated, and wherein the other of the front attachment or the rear attachment is slidingly attachable to and detachable from the vehicle body when the one of the front attachment or the rear attachment is in the unlocked position and the seat bottom is rotated about the other of the front attachment or the rear attachment; and
wherein the other of the front attachment or the rear attachment includes an elongated member attached to the seat bottom and a receiving member attached to the vehicle body and having an aperture disposed therein, the elongated member including an insertion portion configured for insertion into the aperture and a locking portion configured to engage the receiving member to secure the seat bottom to the vehicle body after the insertion portion is inserted into the aperture.

2. The seating system of claim 1, wherein the locking portion is positioned proximally along the elongated member and defines a first curve, and the insertion portion is positioned distally along the elongated member and defines a second curve, the insertion portion being connected to the locking portion such that the first curve and the second curve have opposing orientations.

3. The seating system of claim 2, wherein the elongated member is disengageable from the receiving member when the seat bottom is rotated in a first direction along the first curve and further rotated in a second direction opposite the first direction along the second curve.

4. The seating system of claim 3, wherein the elongated member defines an inflection point between the first curve and the second curve, and the elongated member is disengageable from the receiving member when the seat bottom is moved linearly along the inflection point after the seat bottom is rotated in the first direction and before the seat bottom is rotated in the second direction.

5. The seating system of claim 1, further comprising a plurality of the front attachments and a plurality of the rear attachments.

6. The seating system of claim 1, further comprising a seat back configured for attachment to the seat bottom, and wherein an attachment of the seat back to the seat bottom includes a slotted hinge-pin arrangement that facilitates pivoting of the seat back relative to the seat bottom and attachment and detachment of the seat back relative to the seat bottom when the seat back is positioned relative to the seat bottom at the predetermined angular orientation.

7. A seating system for a vehicle having a vehicle body, the seating system comprising:
 a seat bottom including first and second attachments to the vehicle body, the first attachment having a locked position for securing the seat bottom to the vehicle body at the first attachment and an unlocked position for facilitating detachment of the seat bottom from the vehicle body at the first attachment, the seat bottom being slidingly attachable to and detachable from the vehicle body at the second attachment when the first attachment is in the unlocked position; and
 a seat back pivotably connected to the seat bottom, the seat back being slidingly attachable to and detachable from the seat bottom when the seat back is positioned relative to the seat bottom at a predetermined angular orientation and not slidingly attachable to and detachable from the seat bottom when the seat back is positioned relative to the seat bottom at an angular orientation other than the predetermined angular orientation.

8. The seating system of claim 7, further comprising a plurality of the first attachments and a plurality of the second attachments.

9. The seating system of claim 7, wherein the second attachment includes a receiving member and an elongated member configured to slidingly engage the receiving member to secure the seat bottom to the vehicle body.

10. The seating system of claim 9, wherein the receiving member includes an aperture configured to receive the elongated member therein, and the elongated member includes a first curved portion having a first orientation and a second curved portion having a second orientation different from the first orientation.

11. The seating system of claim 10, wherein the elongated member is disengageable from the receiving member when the seat bottom is rotated in a first direction along the first curved portion and further rotated in a second direction different from the first direction along the second curved portion.

12. The seating system of claim 11, wherein the first curved portion and the second curved portion define a transition portion therebetween, and the elongated member is disengageable from the receiving member when the seat bottom is moved linearly along the transition portion after the seat bottom is rotated in the first direction and before the seat bottom is rotated in the second direction.

13. A seating system for a vehicle having a vehicle body, the seating system comprising:
 a seat bottom attached to the vehicle body at a front attachment and a rear attachment, one of the front attachment or the rear attachment having a locked position for securing the seat bottom to the vehicle body and an unlocked position for facilitating detachment of the seat bottom from the vehicle body, the seat bottom being slidingly attachable to and detachable from the vehicle body at the other of the front attachment or the rear attachment when the one of the front attachment or the rear attachment is in the unlocked position; and
 wherein the other of the front attachment or the rear attachment includes an elongated member and a receiving member, the elongated member including a plurality of curved portions and the receiving member including an aperture configured to receive the elongated member.

14. The seating system of claim 13, wherein the curved portions are configured such that the elongated member is disengageable from the receiving member when the seat bottom is rotated in a first direction along a first curved portion of the curved portions and further rotated in a second direction different from the first direction along a second curved portion of the curved portions.

15. The seating system of claim 14, wherein the first curved portion and the second curved portion define a transition portion therebetween, and the elongated member is disengageable from the receiving member when the seat bottom is moved linearly along the transition portion after the seat bottom is rotated in the first direction and before the seat bottom is rotated in the second direction.

16. The seating system of claim 13, further comprising a seat back configured for attachment to the seat bottom, and wherein an attachment of the seat back to the seat bottom includes a slotted hinge-pin arrangement that facilitates pivoting of the seat back relative to the seat bottom and attachment and detachment of the seat back relative to the seat bottom when the seat back is positioned relative to the seat bottom at a predetermined angular orientation.

* * * * *